United States Patent
Surawski

(10) Patent No.: US 8,313,061 B2
(45) Date of Patent: Nov. 20, 2012

(54) INERT GAS DISTRIBUTION ARRANGEMENT

(75) Inventor: Eric Surawski, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 302 days.

(21) Appl. No.: 12/632,846

(22) Filed: Dec. 8, 2009

(65) Prior Publication Data

US 2011/0133033 A1      Jun. 9, 2011

(51) Int. Cl.
*B64D 45/00*      (2006.01)

(52) U.S. Cl. .................. 244/129.2; 244/135 R

(58) Field of Classification Search .............. 244/135 B, 244/135 R, 135 C, 129.2, 220
See application file for complete search history.

(56) References Cited

U.S. PATENT DOCUMENTS

| | | | |
|---|---|---|---|
| 3,596,559 A | 8/1971 | Gregersen | |
| 3,748,111 A | 7/1973 | Klose | |
| 5,069,692 A * | 12/1991 | Grennan et al. | 96/4 |
| 6,136,267 A | 10/2000 | Bergman | |
| 6,634,598 B2 | 10/2003 | Susko | |
| 6,913,636 B2 | 7/2005 | Defrancesco et al. | |
| 7,013,905 B2 | 3/2006 | Jones et al. | |
| 7,273,507 B2 | 9/2007 | Schwalm | |
| 7,300,494 B2 | 11/2007 | Schwalm et al. | |
| 7,306,644 B2 | 12/2007 | Leigh et al. | |
| 7,509,968 B2 | 3/2009 | Surawski | |
| 2006/0254643 A1 * | 11/2006 | Jones et al. | 137/209 |
| 2011/0068231 A1 * | 3/2011 | Surawski | 244/135 R |

* cited by examiner

*Primary Examiner* — Timothy D Collins
*Assistant Examiner* — Medhat Badawi
(74) *Attorney, Agent, or Firm* — Carlson, Gaskey & Olds PC

(57) ABSTRACT

An example inert gas distribution arrangement includes a first fuel tank and a second fuel tank mountable to an aircraft outboard the first fuel tank. A distribution conduit is configured to communicate inert gas to the first fuel tank through a first outlet and further configured to communicate inert gas to the second fuel tank through a second outlet. Fuel in the distribution conduit is biased to flow from the second fuel tank toward the first fuel tank when the aircraft is in selected aircraft attitudes.

20 Claims, 2 Drawing Sheets

INERT GAS DISTRIBUTION ARRANGEMENT

BACKGROUND

This invention relates to limiting movement of aircraft fuel away from the aircraft's fuel zone, particularly movement of aircraft fuel through the aircraft's inert gas generation system.

Inert gas distribution systems are used to introduce inert gas to fuel tanks within an aircraft. The introduced inert gas, such as nitrogen enriched air, covers the interior of the fuel tanks and displaces a fuel-air mixture within the tanks. As the aircraft uses more fuel, more inert gas is introduced into the fuel tanks. The inert gas desirably reduces the possibility of a fuel-air mixture igniting within the fuel tanks.

As known, the fuel tanks are located within a fuel zone of the aircraft. Flammable fuel is normally present within the fuel zone. The inert gas distribution system is located outside the fuel zone within a flammable leakage zone. In the flammable leakage zone, flammable fuel may be, but is not typically, present. It is often required to maintain a fuel barrier between the fuel zone and the flammable leakage zone. The onboard inert gas distribution system undesirably provides a potential pathway for fuel to leak from the fuel zone to the flammable leakage zone.

SUMMARY

An example inert gas distribution arrangement includes a first fuel tank and a second fuel tank mountable to an aircraft outboard the first fuel tank. A distribution conduit is configured to communicate inert gas to the first fuel tank through a first outlet and further configured to communicate inert gas to the second fuel tank through a second outlet. Fuel in the distribution conduit is biased to flow from the second fuel tank toward the first fuel tank when the aircraft is in selected aircraft attitudes.

An example onboard inert gas distribution system includes a distribution conduit configured to communicate inert gas from an inert gas distribution source through a fuel tank boundary to a fuel tank system within an aircraft. A flame arrestor is configured to block flame movement within the distribution conduit through the fuel tank boundary. A check valve is configured to block fuel flow from the fuel tank system through the fuel tank boundary to the inert gas distribution source.

An example method of maintaining an aircraft fuel tank barrier includes biasing fuel within a distribution conduit of an on-board inert gas distribution system to flow away from a wing tank of a fuel tank system toward a fuselage tank of the fuel tank system.

These and other features of the example disclosure can be best understood from the following specification and drawings, the following of which is a brief description:

DETAILED DESCRIPTION

Figure 1:
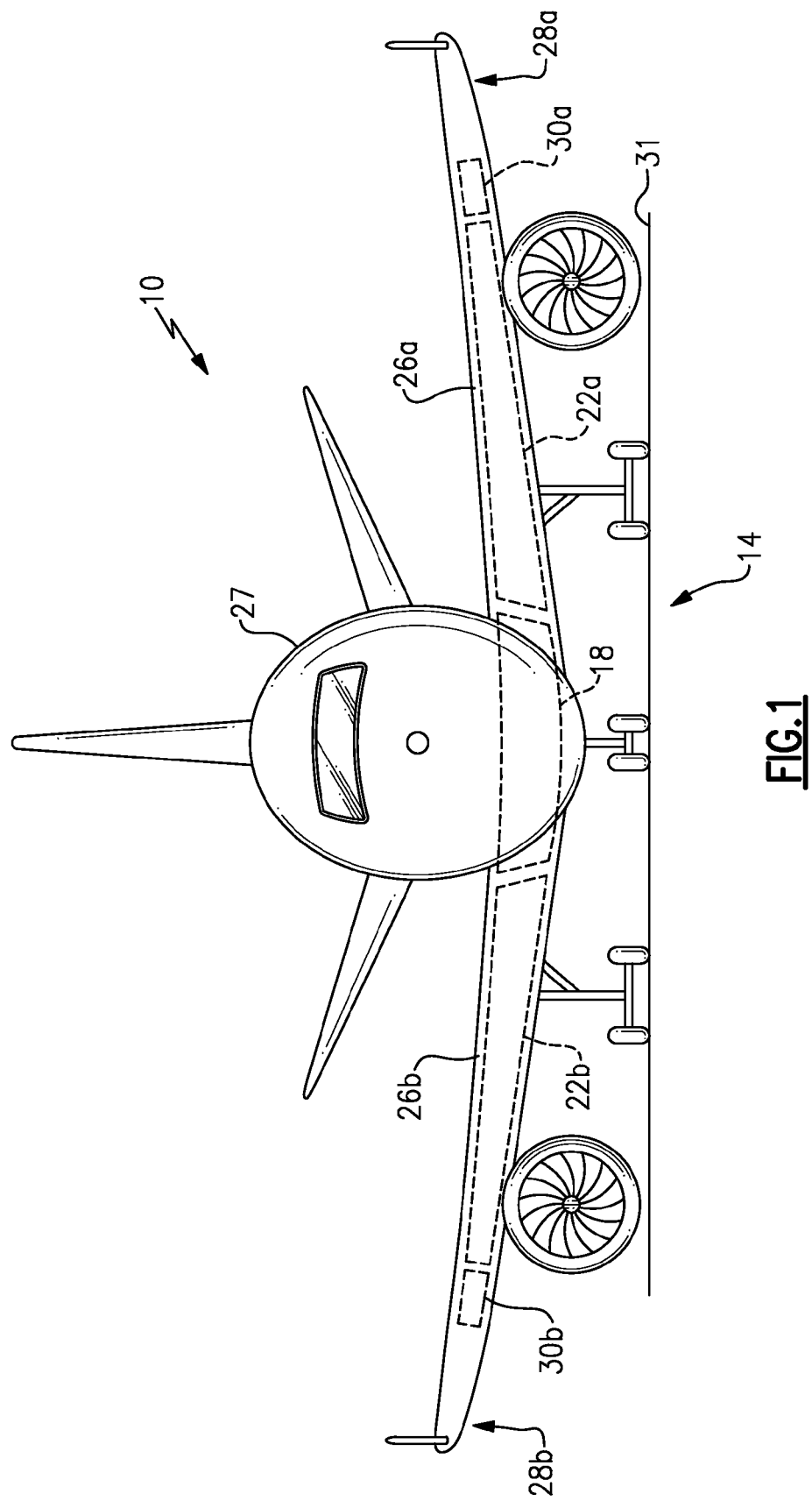
FIG. 1 shows a front view of an example fuel tank system within an aircraft.
Figure 2:
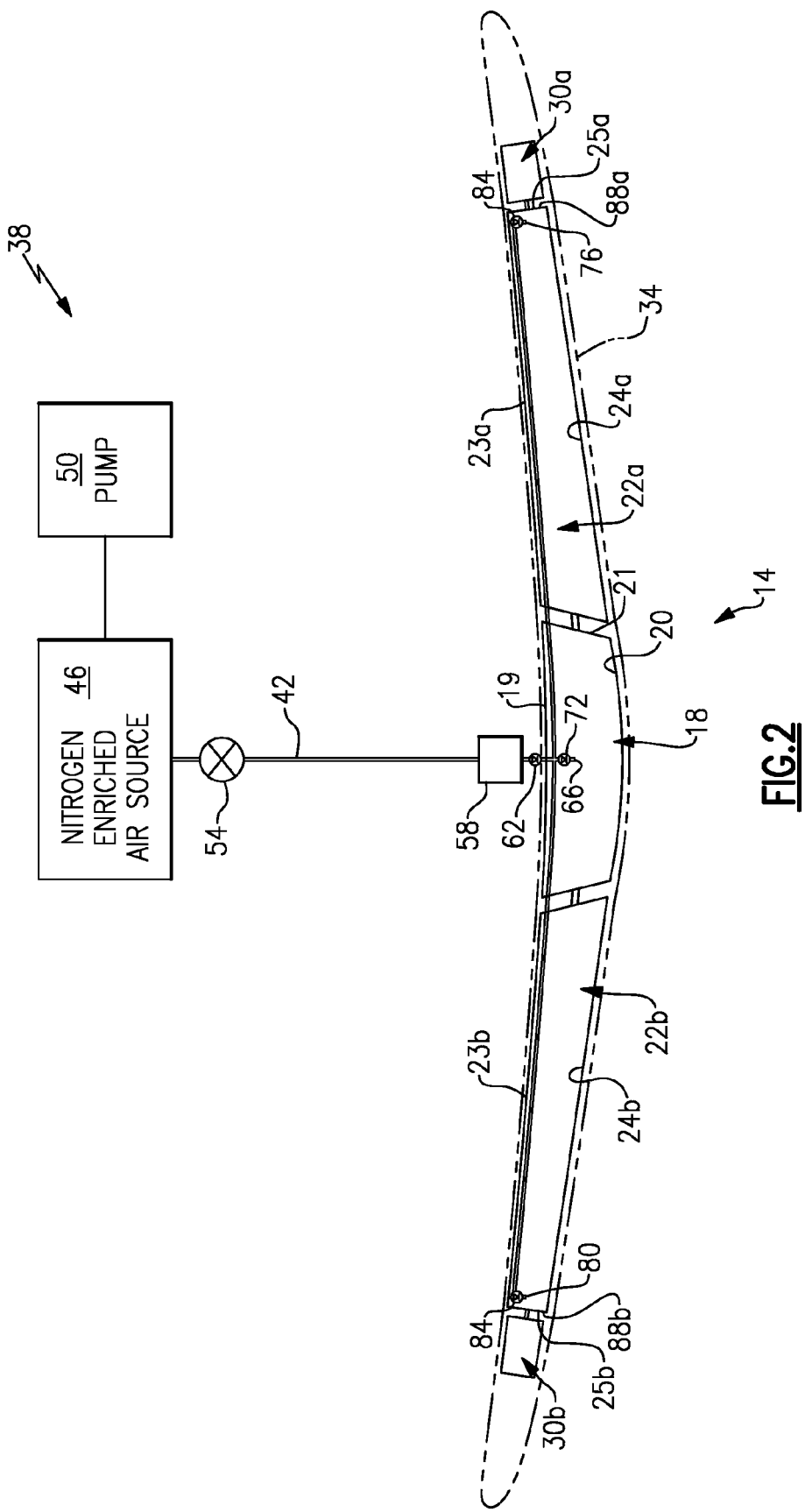
FIG. 2 shows a schematic view of an inert gas distribution arrangement used within the FIG. 1 aircraft.

Referring to FIGS. 1 and 2, an example aircraft 10 includes a fuel tank system 14 having a fuselage tank 18 and wing tanks 22a and 22b. As can be appreciated, the fuselage tank 18 is positioned generally within a fuselage 27 of the aircraft 10 whereas the wing tanks 22a and 22b are positioned generally within the wings 26a and 26b of the aircraft 10.

The fuselage tank 18 includes an upper surface 19, and a lower surface 20 connected by tank walls 21. The wing tanks 22a and 22b each include upper surfaces 23a and 23b, and lower surfaces 24a and 24b connected by tank walls 25a and 25b.

The fuel tank system 14 also includes a pair of surge tanks 30a and 30b housed within the wings 26a and 26b laterally outside the wing tanks 26a and 26b. The surge tanks 30a and 30b are configured to collect fuel spillage from the wing tanks 26A and 26B. Spillage occurs during maneuvers of the aircraft 10, for example.

The periphery of the fuel tank system 14 establishes a fuel tank boundary 34. The fuel zone of the aircraft 10 is within the fuel tank boundary 34. As known, fuel is normally present within the area defined by the fuel tank boundary 34. Fuel is generally undesired outside of the fuel tank boundary.

An onboard inert gas distribution system 38 communicates an inert gas through the fuel tank boundary 34 to the fuel tank system 14. In this example, the onboard inert gas distribution system 38 includes a distribution conduit 42 for communicating inert gas to the fuel tank system 14. The example onboard inert gas distribution system 38 generates nitrogen enriched air. The onboard inert gas distribution system 38 includes a nitrogen enriched air source 46 and a pump 50 configured to move the nitrogen enriched air from the source 46 through the distribution conduit 42.

A shut off valve 54 is configured to block flow through the distribution conduit 42. The shut-off valve 54, in this example, blocks flow of fuel from the fuel tank system 14, through the fuel tank boundary 34, to the onboard inert gas distribution system 38. The shut-off valve also blocks flow of nitrogen enriched air from the onboard inert gas distribution system 38 to the fuel tank system 14.

In this example, the shut-off valve 54 is moved to a closed position that blocks flow when the onboard inert gas distribution system 38 is not communicating the inert gas through the fuel tank boundary 34 to the fuel tank system 14. The shut-off valve 54 is moved to an open position when the onboard inert gas distribution system 38 is communicating the inert gas through the fuel tank boundary 34 to the fuel tank system 14. In the open position, the shut off valve 54 allows flow of nitrogen enriched air from the onboard inert gas distribution system 38 to the fuel tank system 14.

A flame arrestor 58 is positioned within the example distribution conduit 42 adjacent the fuel tank boundary 34. The flame arrestor 58 blocks flames from propagating through the distribution conduit 42 to the fuel tank system 14.

A check valve 62 is positioned within the example distribution conduit 42. The check valve 62 is adjacent the fuel tank boundary 34. The check valve 62 limits fuel flow from the fuel tank system 14 to the onboard inert gas distribution system 38.

In one example, the flame arrestor 58 and the check valve 62 are integrated into a single component.

In this example, the distribution conduit 42 delivers nitrogen enriched air to the fuselage tank 18 and the wing tanks 22a and 22b. Notably, the distribution conduit 42 includes a first outlet 66 that delivers the nitrogen enriched air to the fuselage tank 18. The first outlet 66 is positioned at a vertically high position within the fuselage tank 18 near the upper surface 19. Positioning the first outlet 66 in this area of the fuselage tank 18 helps limit fuel flow from the fuselage tank 18 into the distribution conduit 42 because gravity tends to pull the fuel away from this area of the fuselage tank 18. In one example, the first outlet 66 is positioned at the vertically highest position within the fuselage tank 18. A check valve 72 near the first outlet 66 also limits fuel flow from the fuselage tank 18 to the distribution conduit 42.

The distribution conduit 42 delivers nitrogen enriched air to the wing tank 22a through a second outlet 76, and delivers nitrogen enriched air to the wing tank 22b through a third outlet 80. As can be appreciated from the Figures, the wings 26A and 26B are canted relative to the fuselage 27 of the aircraft 10. That is, laterally outer tips 28a and 28b of the wings 26a and 26b are more vertically elevated relative to ground 31 than the other areas of the wings 26a and 26b.

The second outlet 76 and the third outlet 80 are each positioned adjacent the outermost walls 88a and 88b of the wing tanks 22a and 22b, which are more elevated than other areas of the wing tanks 22a and 22b. Positioning the second outlet 76 and the third outlet 80 in the more elevated area near the outermost walls 88a and 88b helps limit fuel flow from the wing tanks 22a and 22b to the distribution conduit 42 because the fuel tends to move toward less elevated areas of the wing tanks 22a and 22b, which are closer to the fuselage tank 18 than the outermost walls 88a and 88b. The second outlet 76 and the third outlet 80 each include check valves 84 that limit fuel flow from the wing tanks 22a and 22b to the distribution conduit 42.

In this example, the first outlet 66 is positioned vertically below the second outlet 76 and the third outlet 80 when the aircraft 10 has a zero bank angle. Positioning the first outlet 66 of the fuselage tank 18 below the second outlet 76 and the third outlet 80 facilitates draining any fuel present in the distribution conduit 42 toward the fuselage tank 18. That is, the portions of the distribution conduit 42 configured to communicate fuel to the wing tanks 22a and 22b are also configured to bias fuel flow within the distribution conduit 42 toward the fuselage tank 18.

The example aircraft 10 of FIG. 1 is shown in a position having a zero bank angle. That is, the example aircraft 10 is not banked or rolled relative to the ground 31 or horizon. In this example, the aircraft 10 has a zero bank angle when the aircraft 10 is parked and during level flight operation.

The example aircraft 10 rolls relative to the horizon during in-flight maneuvers. Rolling can, for example, increase the distance between the outer tip 28a and the ground 31 while decreasing the distance between the outer tip 28b and the ground 31. In such an example, rolling would cause fuel to flow from the wing tank 22a to the fuselage tank 18 and from the fuselage tank 18 to the wing tank 22b. The check valve 84 at the third outlet 80 blocks fuel in the wing tank 22b from entering the distribution conduit 42.

Features of this invention include positioning fuel tank outlets for an onboard inert gas distribution system in areas of the fuel tanks that are less likely to contain fuel than other areas. Another feature of this invention includes biasing fuel in the distribution conduit to flow toward a central fuel tank.

Although a preferred embodiment has been disclosed, a worker of ordinary skill in this art would recognize that certain modifications would come within the scope of this invention. For that reason, the following claims should be studied to determine the true scope and content of this invention.

I claim:

1. An inert gas distribution arrangement comprising:
   a first fuel tank;
   a second fuel tank mountable to an aircraft outboard the first fuel tank; and
   a distribution conduit configured to communicate inert gas to the first fuel tank through a first outlet and further configured to communicate inert gas to the second fuel tank through a second outlet, wherein fuel in the distribution conduit is biased to flow from the second fuel tank toward the first fuel tank when the aircraft is in selected aircraft attitudes.

2. The inert gas distribution arrangement of claim 1, wherein the selected aircraft attitudes comprises a zero bank angle.

3. The inert gas distribution arrangement of claim 1, wherein the second outlet is vertically above the first outlet when the aircraft is in selected aircraft attitudes.

4. The inert gas distribution arrangement of claim 1, including a first check valve adjacent the first outlet configured to limit fuel flow from first tank to the distribution conduit, and a second check valve adjacent the second outlet configured to limit fuel flow from second tank to the distribution conduit.

5. The inert gas distribution arrangement of claim 1, including a third tank mountable to the aircraft outboard the first tank on an opposite side from the second tank, the distribution conduit having a third opening configured to deliver inert gas to the third tank, wherein fuel in the distribution conduit is biased to flow from the third tank toward the first fuel tank when the aircraft is the selected positions.

6. The inert gas distribution arrangement of claim 1, wherein the second tank is a wing tank.

7. The inert gas distribution arrangement of claim 1, wherein the peripheral portions of the first tank and the second tank establish a fuel tank boundary, and the first outlet and the second outlet are positioned within the fuel tank boundary.

8. An on-board inert gas distribution system comprising:
   a distribution conduit configured to communicate inert gas from an inert gas distribution source through a fuel tank boundary to a fuel tank system within an aircraft;
   a flame arrester configured to block flame movement within the distribution conduit through the fuel tank boundary; and
   a check valve configured to block fuel flow from the fuel tank system through the fuel tank boundary to the inert gas distribution source.

9. The on-board inert gas distribution system of claim 8, including a shut off valve configured to block fuel flow from the fuel tank system to the inert gas distribution source.

10. The on-board inert gas distribution system of claim 8, wherein a periphery of the fuel tank system establishes the fuel tank boundary.

11. The on-board inert gas distribution system of claim 8, wherein fuel in the distribution conduit is biased to flow from a wing tank of the fuel tank system toward a fuselage tank of the fuel tank system when aircraft is in selected aircraft attitudes.

12. The on-board inert gas distribution system of claim 11, wherein the selected positions include the aircraft in a parked position.

13. The on-board inert gas distribution system of claim 8, wherein the distribution conduit is configured to deliver fuel to a wing tank of the fuel tank system adjacent an outboard wall of the wing tank.

14. The on-board inert gas distribution system of claim 8, wherein the distribution conduit is configured to deliver inert gas to a center tank of the fuel tank system at the highest point of the center tank.

15. The on-board inert gas distribution system of claim 8, wherein the flame arrester and the check valve are integrated into a single component.

16. The inert gas distribution arrangement of claim 1, wherein the first outlet is within the first fuel tank, and the second outlet is within the second fuel tank.

17. The inert as distribution arrangement of claim 4, wherein the first check valve is within the first fuel tank, and a second check valve is within the second fuel tank.

18. The inert gas distribution arrangement of claim 1, wherein the second outlet is positioned closer to an outboard wall of the second fuel tank than an inboard wall of the second fuel tank.

19. The inert gas distribution arrangement of claim 1, wherein the distribution conduit is angled relative to a horizon.

20. The inert gas distribution arrangement of claim 1, wherein the distribution conduit includes exclusively inert gas.

* * * * *